United States Patent
Hyman et al.

(10) Patent No.: US 9,671,121 B2
(45) Date of Patent: Jun. 6, 2017

(54) MOTION TRACKING

(71) Applicants: Nick Hyman, Los Altos Hills, CA (US); Bo E. Ericsson, Los Gatos, CA (US); Tanuj Mohan, Mountain View, CA (US)

(72) Inventors: Nick Hyman, Los Altos Hills, CA (US); Bo E. Ericsson, Los Gatos, CA (US); Tanuj Mohan, Mountain View, CA (US)

(73) Assignee: enLighted, Inc., Sunnyvale, CA (US)

( * ) Notice: Subject to any disclaimer, the term of this patent is extended or adjusted under 35 U.S.C. 154(b) by 395 days.

(21) Appl. No.: 14/183,747

(22) Filed: Feb. 19, 2014

(65) Prior Publication Data
US 2015/0234366 A1 Aug. 20, 2015

(51) Int. Cl.
*G05B 11/01* (2006.01)
*F24F 11/00* (2006.01)

(52) U.S. Cl.
CPC ... *F24F 11/0034* (2013.01); *F24F 2011/0036* (2013.01)

(58) Field of Classification Search
None
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,812,422 A | 9/1998 | Lyons | |
| 6,057,654 A | 5/2000 | Cousy et al. | |
| 6,157,299 A * | 12/2000 | Wang | G08B 29/24 340/506 |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,154,399 B2 * | 12/2006 | Cuddihy | G08B 21/028 340/506 |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,550,931 B2 | 6/2009 | Lys et al. | |
| 7,557,718 B2 * | 7/2009 | Petrosenko | A61B 5/1126 340/573.1 |
| 7,566,137 B2 | 7/2009 | Veskovic | |

(Continued)

FOREIGN PATENT DOCUMENTS

| | | |
|---|---|---|
| KR | WO 2013-055137 | 4/2013 |
| WO | WO 2013-001407 | 1/2013 |

OTHER PUBLICATIONS

PCT/US2015/015207 May 11, 2015, Notification of Transmittal of the International Search Report and the Written Opinion of the International Searching Authority, or the Declaration.

*Primary Examiner* — Diem Cao
(74) *Attorney, Agent, or Firm* — Brian R. Short

(57) ABSTRACT

Apparatuses, methods, apparatuses and systems for tracking motion are disclosed. One method includes identifying a group of sensors that includes a plurality of neighboring sensors sensing motion greater than a threshold during a time interval, and tracking motion, comprising linking the group to at least one past group of at least one past time interval.

19 Claims, 9 Drawing Sheets

---

Identifying a group of sensors that includes a plurality of neighboring sensors sensing motion greater than a motion threshold during a time interval

910

Tracking motion, comprising linking the group to at least one past group of at least one past time interval

920

(56) References Cited

U.S. PATENT DOCUMENTS

| | | |
|---|---|---|
| 7,623,042 B2 | 11/2009 | Huizenga |
| 7,792,956 B2 | 9/2010 | Choong et al. |
| 7,812,543 B2 | 10/2010 | Budike, Jr. |
| 7,925,384 B2 | 4/2011 | Huizenga et al. |
| 8,630,741 B1 | 1/2014 | Matsuoka et al. |
| 2004/0002792 A1 | 1/2004 | Hoffknecht |
| 2004/0140909 A1* | 7/2004 | Meadows ............... G08G 1/052 340/905 |
| 2005/0169643 A1 | 8/2005 | Franklin et al. |
| 2005/0171709 A1* | 8/2005 | Nortier .................. E03B 7/071 702/45 |
| 2006/0267780 A1* | 11/2006 | Adams ................. A61B 5/1113 340/573.1 |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0273500 A1* | 11/2007 | Chiu .................. H05B 37/0272 340/522 |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0085494 A1* | 4/2009 | Summerland ...... H05B 33/0857 315/291 |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0235667 A1* | 9/2010 | Mucignat ............. G06F 1/3203 713/323 |
| 2010/0250481 A1* | 9/2010 | Tomastik ............. G06Q 10/087 706/52 |
| 2010/0264846 A1 | 10/2010 | Chemel et al. |
| 2010/0270933 A1 | 10/2010 | Chemel et al. |
| 2010/0280677 A1 | 11/2010 | Budike, Jr. |
| 2010/0295482 A1 | 11/2010 | Chemel et al. |
| 2010/0301777 A1 | 12/2010 | Kraemer |
| 2011/0031897 A1 | 2/2011 | Henig et al. |
| 2011/0199020 A1 | 8/2011 | Henig et al. |
| 2012/0123563 A1 | 5/2012 | Drinkard |
| 2012/0130544 A1* | 5/2012 | Mohan ............... H05B 37/0218 700/275 |
| 2013/0006899 A1* | 1/2013 | Cook .................. G06K 9/00771 706/12 |
| 2013/0073093 A1 | 3/2013 | Songkakul |
| 2014/0175990 A1* | 6/2014 | Bhatkar ............. H05B 37/0245 315/154 |
| 2014/0296657 A1* | 10/2014 | Izmirli ..................... A61B 6/04 600/301 |
| 2014/0320403 A1* | 10/2014 | Lee .......................... G06T 7/20 345/156 |
| 2015/0005951 A1* | 1/2015 | Srinivasan ............. G05B 15/02 700/275 |
| 2015/0177716 A1 | 6/2015 | Hyman et al. |
| 2016/0081594 A1* | 3/2016 | Gaddipati ............ A61B 5/1113 600/595 |

* cited by examiner

Identifying a group of sensors that includes a plurality of neighboring sensors sensing motion greater than a motion threshold during a time interval

910

Tracking motion, comprising linking the group to at least one past group of at least one past time interval

920

FIGURE 9 ial control.

MOTION TRACKING

FIELD OF THE EMBODIMENTS

The described embodiments relate generally to environmental control systems. More particularly, the described embodiments relate to methods, apparatuses and systems for tracking motion which can be used for environmental control.

BACKGROUND

Intelligent lighting and environmental control systems reduce power consumption of lighting and environmental control while improving the experience of occupants of structures that utilize the lighting and environmental control systems. A factor utilized in controlling the systems is determination of occupancy and tracking of motion. Further, the occupancy and motion tracking can be used for controlling the systems.

It is desirable to have a method, system and apparatus for tracking motion of an area.

SUMMARY

One embodiment includes a method of tracking motion. The method includes identifying a group of sensors that includes a plurality of neighboring sensors sensing motion greater than a threshold during a time interval, and tracking motion, comprising linking the group to at least one past group of at least one past time interval.

Another embodiment includes a system for tracking motion. The system includes a plurality of sensors and a controller that receives sense information from the plurality of sensors. The controller is operative to identify a group of sensors that includes a plurality of neighboring sensors sensing motion greater than a threshold during a time interval, and track motion of the group, comprising linking the group to at least one past group of at least one past time interval.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of a method of tracking motion, according to another embodiment.

DETAILED DESCRIPTION

Figure 1:
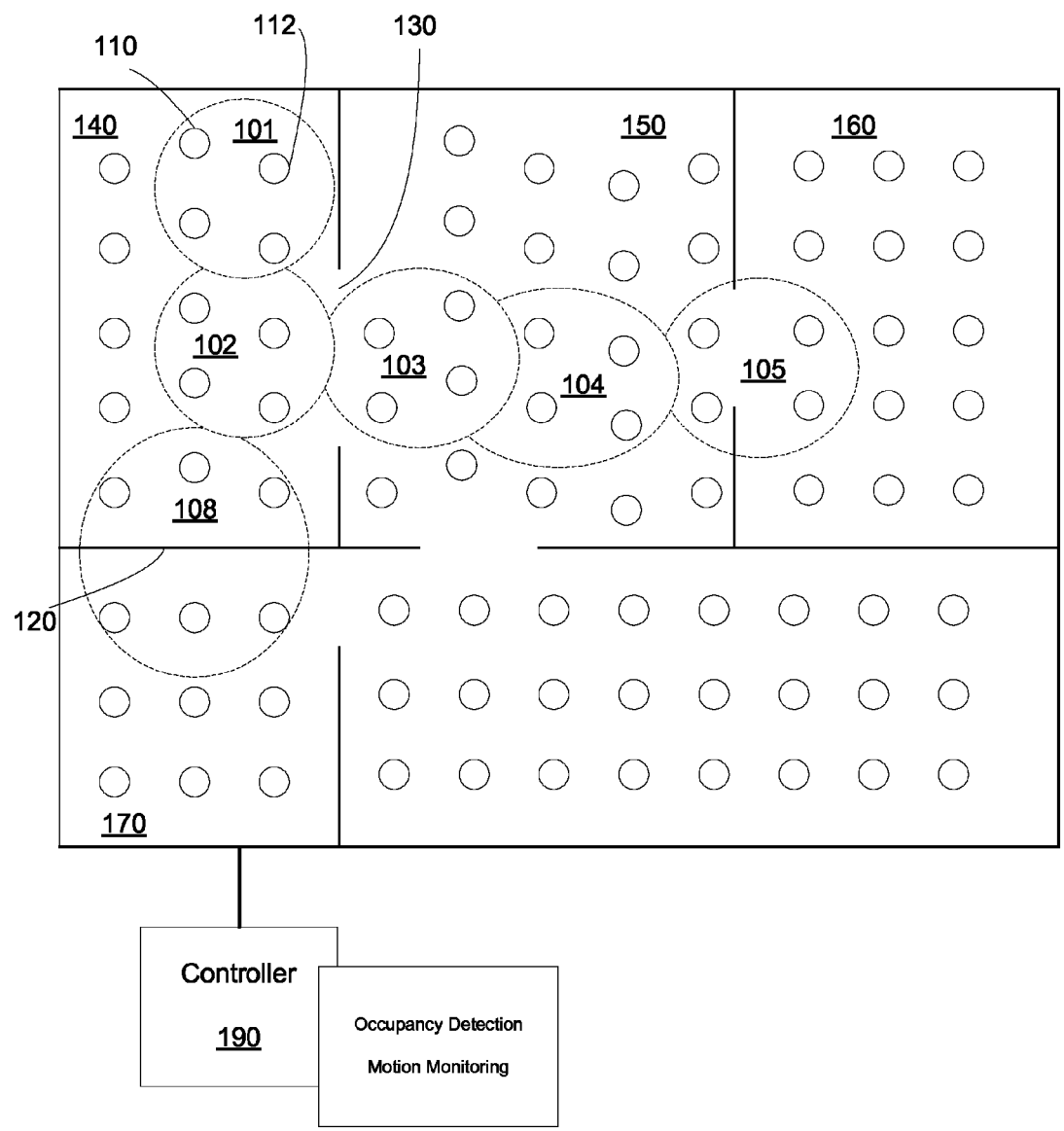
FIG. 1 shows an area that includes multiple rooms, wherein sensors within each of the multiple rooms and a controller are utilized for tracking motion, according to an embodiment.

As shown in the drawings, the described embodiments provide methods, apparatuses, and systems for tracking motion. For an embodiment, a plurality of sensors of an area or structure, are monitored over multiple time intervals. For each time interval, groups of sensor are identified that sense motion of greater than a threshold for the time interval, thereby indicating the presence of, for example, an occupant. A group of a time interval is linked with other groups of different time intervals, thereby indicated motion. The motion is tracked across multiple time intervals, thereby tracking motion within the area or structure.

The aggregation of the sensor data over time provides valuable insights for parties interested in optimizing space utilization and planning the construction of future spaces. This aggregation can be used to detect abnormalities in real time operation of, for example, an office building.

FIG. 1 shows an area that includes multiple rooms 140, 150, 160, 170, wherein sensors (such as, sensor 110 or 112) within each of the multiple rooms 140, 150, 160, 170 and a controller 190 are utilized for tracking motion, according to an embodiment. Groups of sensors are identified for each of different time intervals 101, 102, 103, 104, 105 based on motion sensed by the sensors, and by the locations of the sensors.

For the first time interval 101, a sensor (such as, sensor 110) senses motion and generating a sense signal that indicates sensed motion of greater than a predetermined threshold. Neighboring sensors (such as, sensor 112) that also sense motion greater than the predetermined threshold or greater than a second predetermined threshold are included within the group of the first time interval 101. As will be described, for an embodiment, neighboring sensors are identified based upon prior knowledge of the locations of the sensors. For an embodiment, neighboring sensors are sensors having a location within a distance threshold of each other. However, for at least some embodiments, the criteria for determining or selecting neighbor sensors is not based on entirely based upon distances between sensors. At least some embodiments additionally or alternatively account for sensor spacing, other sensors in the area, and/or obstructions. Additionally, the distance threshold does not have to be preselected. For an exemplary embodiment, the distance threshold is selected to be two times the average distance to the second closest sensor (that is, the sensor second closest to initially sensing sensor). Generally, the distance threshold is preselected. For an embodiment, neighboring sensors are predetermined based on the prior location knowledge of the sensors.

For the second time interval 102, a sensor is again identified that sensed motion greater than a threshold. Again, a group is then determined. For at least some embodiments, motion is sensed by linking a group of the first time interval 101 with a group of the second time interval. For an embodiment, the linking is determined by the proximity of the sensors within the different groups. For an embodiment, the linking is established by a commonality of at least one sensor. For an embodiment, the linking is based on identifying neighboring sensors of the different groups. For an embodiment, the linking is based on identifying neighboring sensors that are also neighbors of neighboring sensors of the different groups.

The motion tracking also includes identifying groups that physically cannot exist, and motion of groups that physically cannot occur. For example, a group 108 can be determined for a time interval. However, due to the existence of a wall 120 within the group, physically, the group cannot actually exist, and the group is then determined to not be valid.

As shown, the motion tracking of the different time intervals 101, 102, 103, 104, 105 shows motion from the first room 140, to the second room 150, and to the third room 160. This motion physically is acceptable because the group motion passes through, for example, doorways (such as, doorway 130). However, such group motion would not be determined to be valid if the motion passed, for example, through a barrier, such as, a wall 120.

As shown, for an embodiment, a controller is electronically interfaced with a controller 190. For at least some embodiments, the controller 190 is operable to processed sensed sensor information to monitor motion of groups, and thereby, sense motion. While shown as a standalone controller, it is to be understood that for an embodiment, each of the sensors include controllers, and the sensed information processing can be performed by any combination of one of more of the sensor controllers. That is, the sensed information processing can be centralized, or de-centralized across the controllers of the sensors.

For an embodiment, communication links are established between each of the sensors and the controller 190. For an embodiment, the sensors are directly linked to the controller 190. For another embodiment, at least some of the sensors are linked to the controller 190 through other sensors. For an embodiment, the sensors form a wireless mesh network that operates to wirelessly connect (link) each of the sensors to the controller.

Regardless of the location or configuration of the controller 190, for an embodiment, the controller 190 is operative to receive sense data from the plurality of sensors, group the data according to identified groupings of the plurality of sensors, and track motion within at least a portion of the area based on data analytics processing of one or more of the groups of sensed data.

Figure 2:
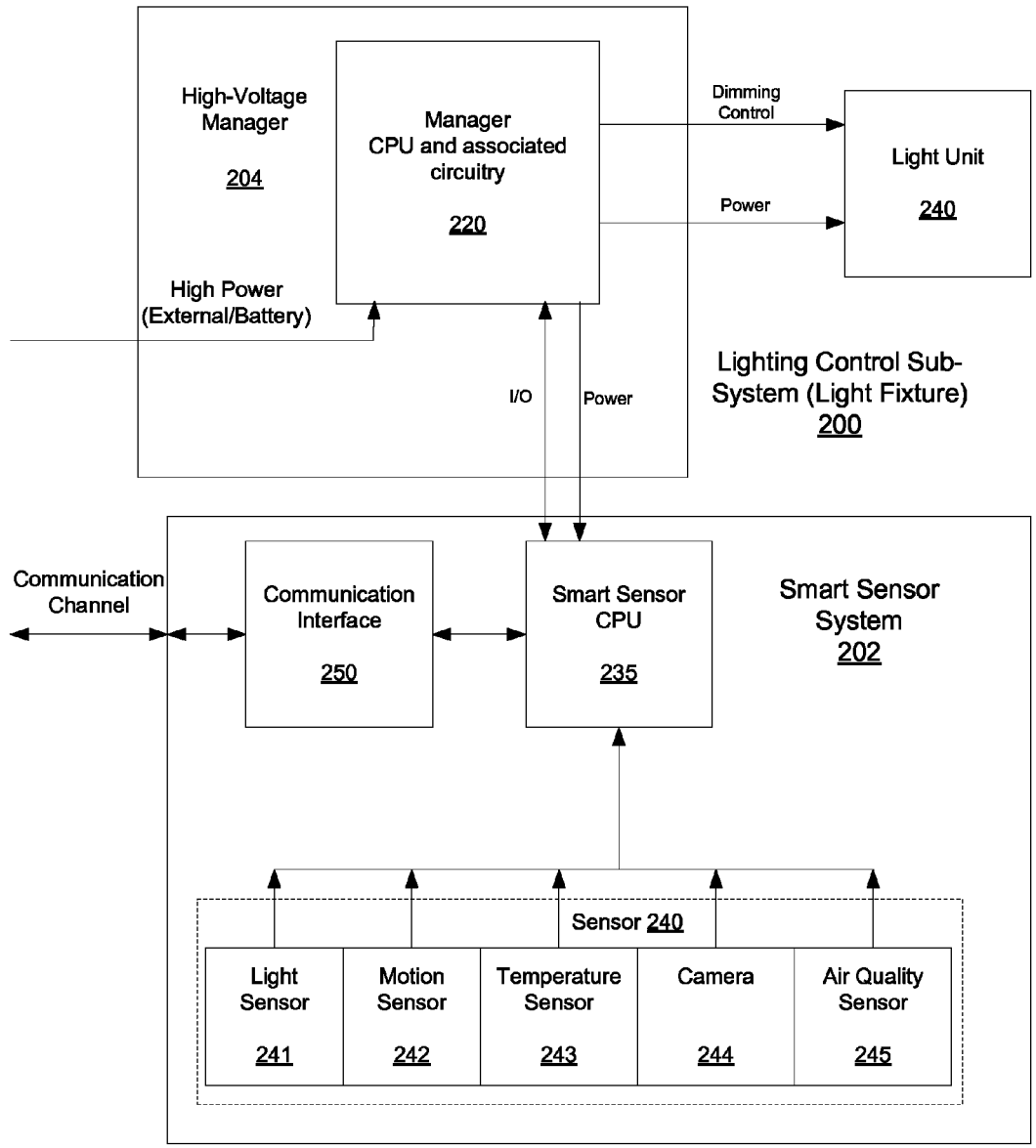
FIG. 2 shows a sensor and associated lighting control, according to an embodiment.

FIG. 2 shows sensor and associated lighting control, according to an embodiment. For an embodiment, the sensors described include a smart sensor system 202. Further, a lighting control system 200 includes the smart sensor system 202 that is interfaced with a high-voltage manager 204, which is interfaced with a luminaire 240. The sensor and associated lighting control of FIG. 2 is one exemplary embodiment of the sensors utilized for tracking motion. Many different sensor embodiments are adapted to utilization of the described embodiments for tracking motion. For at least some embodiments, sensors that are not directly associated with light control are utilized.

The motion tracking of the described embodiments can be utilized for optimal control of lighting and other environmental controls of an area or structure that utilizes the motion tracking. The control can be configured to save energy and provide comfort to occupants of the area or structure.

The high-voltage manager 204 includes a controller (manager CPU) 220 that is coupled to the luminaire 240, and to a smart sensor CPU 235 of the smart sensor system 202. As shown, the smart sensor CPU 245 is coupled to a communication interface 250, wherein the communication interface 250 couples the controller to an external device. The smart sensor system 202 additionally includes a sensor 240. As indicated, the sensor 240 can include one or more of a light sensor 241, a motion sensor 242, and temperature sensor 243, and camera 244 and/or an air quality sensor 245. It is to be understood that this is not an exhaustive list of sensors. That is additional or alternate sensors can be utilized for occupancy and motion detection of a structure that utilizes the lighting control sub-system 200. The sensor 240 is coupled to the smart sensor CPU 245, and the sensor 240 generates a sensed input. For at least one embodiment, at least one of the sensors is utilized for communication with the user device.

For an embodiment, the temperature sensor 243 is utilized for motion tracking. For an embodiment, the temperature sensor 243 is utilized to determine how much and/or how quickly the temperature in the room has increased since the start of, for example, a meeting of occupants. How much the temperate has increased and how quickly the temperature has increased can be correlated with the number of the occupants. All of this is dependent on the dimensions of the room and related to previous occupied periods. For at least some embodiment, estimates and/or knowledge of the number of occupants within a room are used to adjust the HVAC (heating, ventilation and air conditioning) of the room. For an embodiment, the temperature of the room is adjusted based on the estimated number of occupants in the room.

According to at least some embodiments, the controllers (manager CPU 220 and the smart sensor CPU) are operative to control a light output of the luminaire 240 based at least in part on the sensed input, and communicate at least one of state or sensed information to the external device.

For at least some embodiments, the high-voltage manager 204 receives the high-power voltage and generates power control for the luminaire 240, and generates a low-voltage supply for the smart sensor system 202. As suggested, the high-voltage manager 204 and the smart sensor system 202 interact to control a light output of the luminaire 240 based at least in part on the sensed input, and communicate at least one of state or sensed information to the external device. The high-voltage manager 204 and the smart sensor system 202 can also receive state or control information from the external device, which can influence the control of the light output of the luminaire 240. While the manager CPU 220 of the high-voltage manager 204 and the smart sensor CPU 245 of the smart sensor system 202 are shown as separate controllers, it is to be understood that for at least some embodiments the two separate controllers (CPUs) 220, 245 can be implemented as single controller or CPU.

For at least some embodiments, the communication interface 250 provides a wireless link to external devices (for example, the central controller, the user device and/or other lighting sub-systems or devices).

An embodiment of the high-voltage manager 204 of the lighting control sub-system 200 further includes an energy meter (also referred to as a power monitoring unit), which receives the electrical power of the lighting control sub-system 200. The energy meter measures and monitors the power being dissipated by the lighting control sub-system 200. For at least some embodiments, the monitoring of the dissipated power provides for precise monitoring of the dissipated power. Therefore, if the manager CPU 220 receives a demand response (typically, a request from a power company that is received during periods of high power demands) from, for example, a power company, the manager CPU 220 can determine how well the lighting control sub-system 200 is responding to the received demand response. Additionally, or alternatively, the manager CPU 220 can provide indications of how much energy (power) is being used, or saved.

Figure 3:
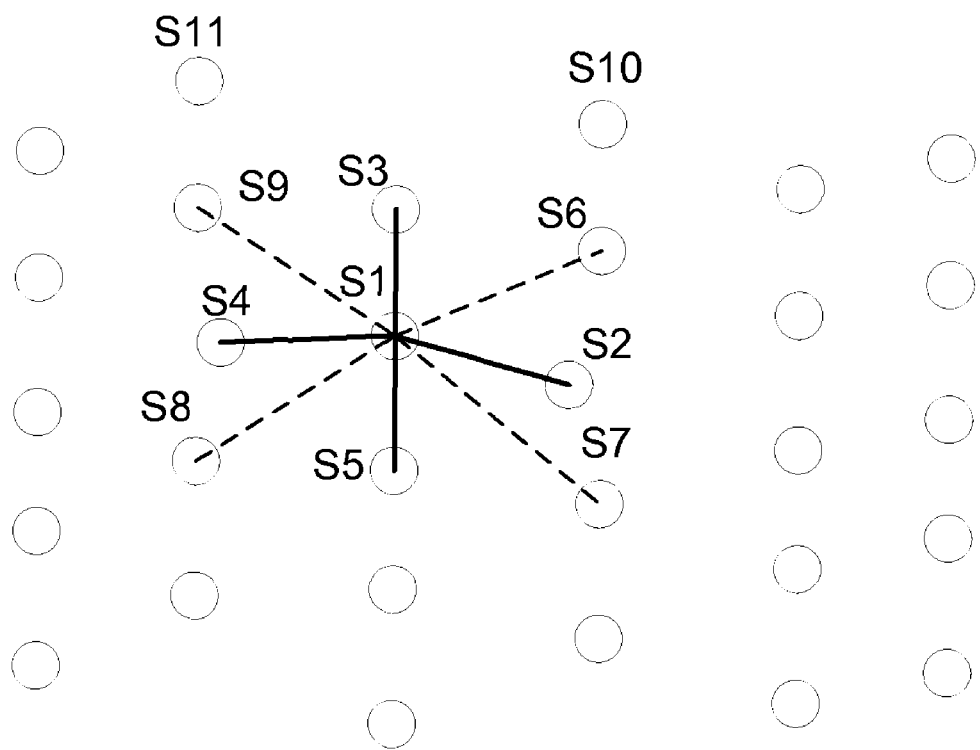
FIG. 3 shows multiple sensors, including specific sensors and neighboring sensors of the specific sensors, according to an embodiment.

FIG. 3 shows multiple sensors, including specific sensors and neighboring sensors of the specific sensors, according to an embodiment. As shown, a specific sensor S1 is identified. For an embodiment, location information of the sensors is utilized to identify neighboring sensors. The neighbor sensor determinations can be predetermined, or adaptively adjusted and selected based on the type of motion being tracked. For an embodiment, the neighboring sensors are preselected (chosen beforehand) and a not changed after being selected. For an embodiment, a neighboring status of two previously selected neighboring sensors can be updated or changed if the motion sensing patterns are not reflected by the motion sensing patterns of typical neighboring sensors.

As shown in FIG. 3, sensors S2, S3, S4, S5 are neighboring sensor of sensor S1. Therefore, when sensor S1 is determined to have sensed motion greater than a threshold, the neighboring sensors S2, S3, S4, S5 are checked to determine whether they sensed motion of greater than the threshold, or greater than a second threshold during the same time interval. For an embodiment, the neighboring sensors that do sense motion of greater than the threshold, or greater than a second threshold during the same time interval are included within a group established by the motion sensing of the sensor S1.

Further, as shown in FIG. 3, other proximate sensors are determined not to be neighboring sensor of S1. For an embodiment, sensors S6, S7, S8, S9, S10, S11 are not neighboring sensor because, for example, they are located more than a threshold distance away from the sensor S1.

As previously described, additional or alternate criteria can be used for the determination or selection of which sensor are designated as neighboring sensors other than distance alone. The neighboring sensor determinations can also take into account sensor spacing, other sensors in the area, as well as walls and obstructions. The distance threshold for determining neighboring sensors does not have to be preselected. For an exemplary embodiment, the distance threshold is two times the average distance between a sensor and its second closest sensor.

For example, the sensor S10 of FIG. 3 could be selected as a neighboring sensor of S11 because there is no sensor located directly above sensor S3. However, if there was a sensor location just above S3, then sensor S10 and sensor S11 would not be selected as neighboring sensors.

Figure 4:
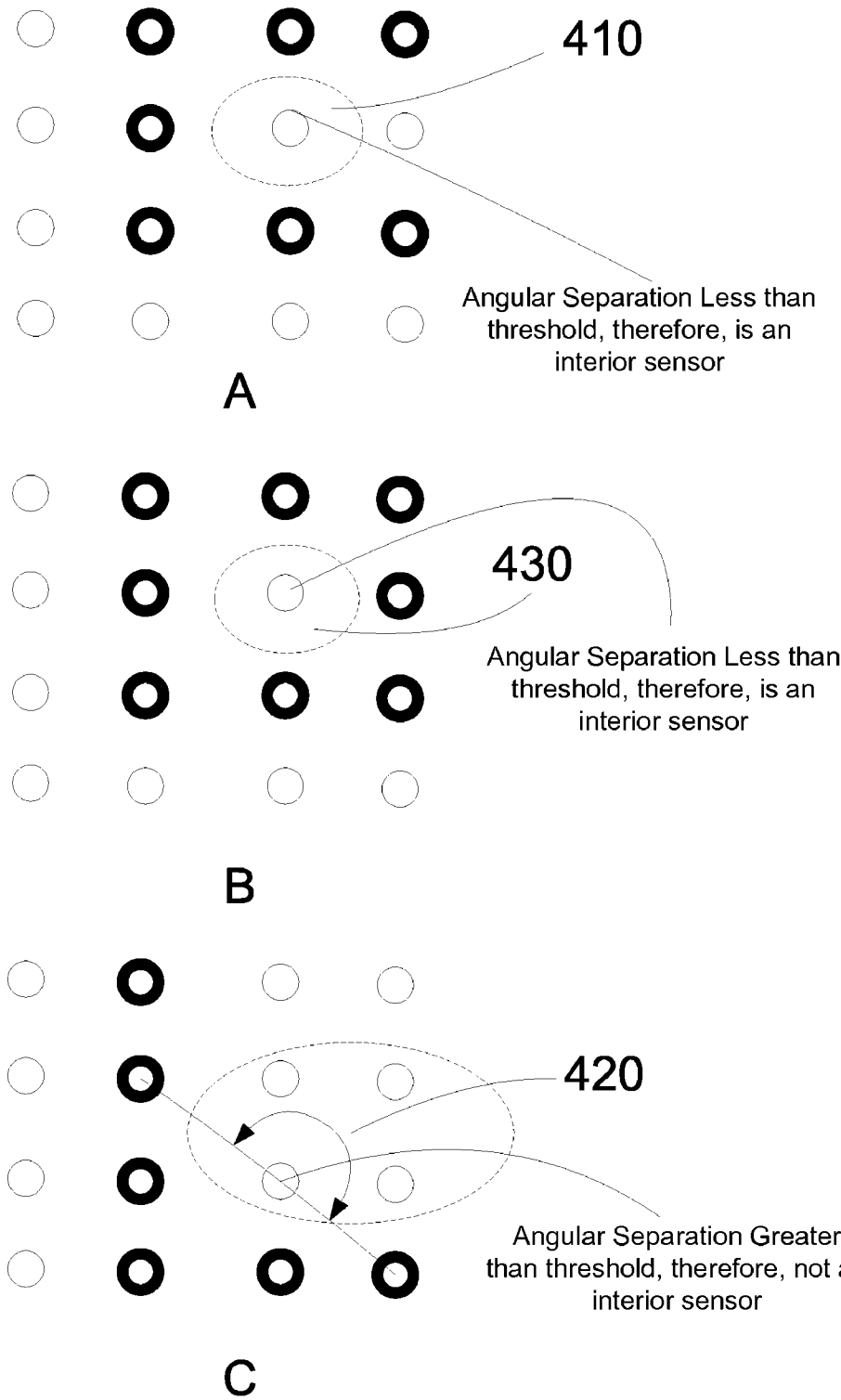
FIG. 4 shows invalid groups of sensors, according to an embodiment.

FIG. 4 shows invalid groups of sensors, according to an embodiment. As described, groups of sensor are identified over time intervals, and motion is tracked by linking the groups of the different time intervals. At least some embodiments include identifying groups that are initially selected, and then the shape of the group is refined (that is, modifying the sensors that are included within the group). For an embodiment, refining the shape of the group include identifying shape of the group that are not allowed for a valid group. For at least some embodiments, this includes identifying invalid shapes, and the changing the sensors included within the group to make the group into a valid or acceptable shape, or ignoring the motion tracking of the group.

FIG. 4 shows some exemplary invalid shapes. A first shape "A" includes a shape in the form of a "C". This shape of this group includes an interior sensor 410 which is not allowable. Therefore, the shape of this group is to be modified to eliminate the interior sensors.

A second shape "B" includes a shape in the form of a "O". This shape of this group includes an interior sensor 430 which is not allowable. Therefore, the shape of this group is to be modified to eliminate the interior sensors.

For an embodiment, an interior sensor is a non-active sensor (that is, a sensor that does not sense motion of greater than a motion threshold), wherein an angular separation between neighboring active sensors of the group is less than a threshold amount. For a specific embodiment, the threshold amount is approximately 135 degrees. This relationship hold true for both of the interior sensors of the first shape and second shape described above. Therefore, an embodiment includes invalidating a group of sensors of an internal non-active sensor has an angular separation between active sensors within the group of less than a threshold angle or amount. The sensors of the group are reselected to eliminate the non-active interior sensor.

A third shape "C" includes a shape in the form of an "L". Analysis of this shape, however, reveals that there are not interior sensors. That is, for each of the interior sensor candidates, there is an angular separation (as shown by the arrows) that is greater than 135 degrees.

However, the "L" shaped group could be broken down to eliminate sensors for other reasons.

Figure 5:
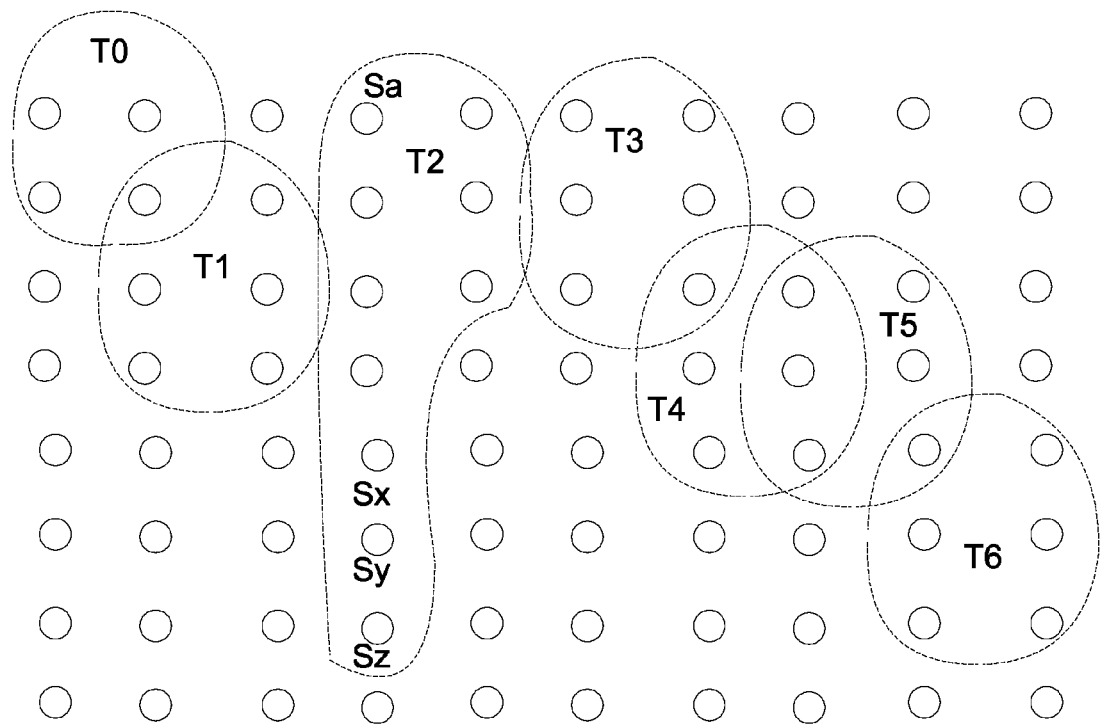
FIG. 5 shows a group of sensors being tracked over multiple frames, according to an embodiment.

FIG. 5 shows a group of sensors being tracked over multiple frames, according to an embodiment. For an embodiment, sensors of a group are not allowed to be greater than a predetermined distance from each other. For example, the group of time interval T2 of FIG. 5 includes sensors Sx, Sy, Sz that can be determined to be physically too far in distance from the sensor Sa. Therefore, the sensors Sx, Sy, Sz can be eliminated from group of the time interval T2. For an embodiment, the sensors Sx, Sy, Sz can be the basis for the formation of a new group.

Figure 6:
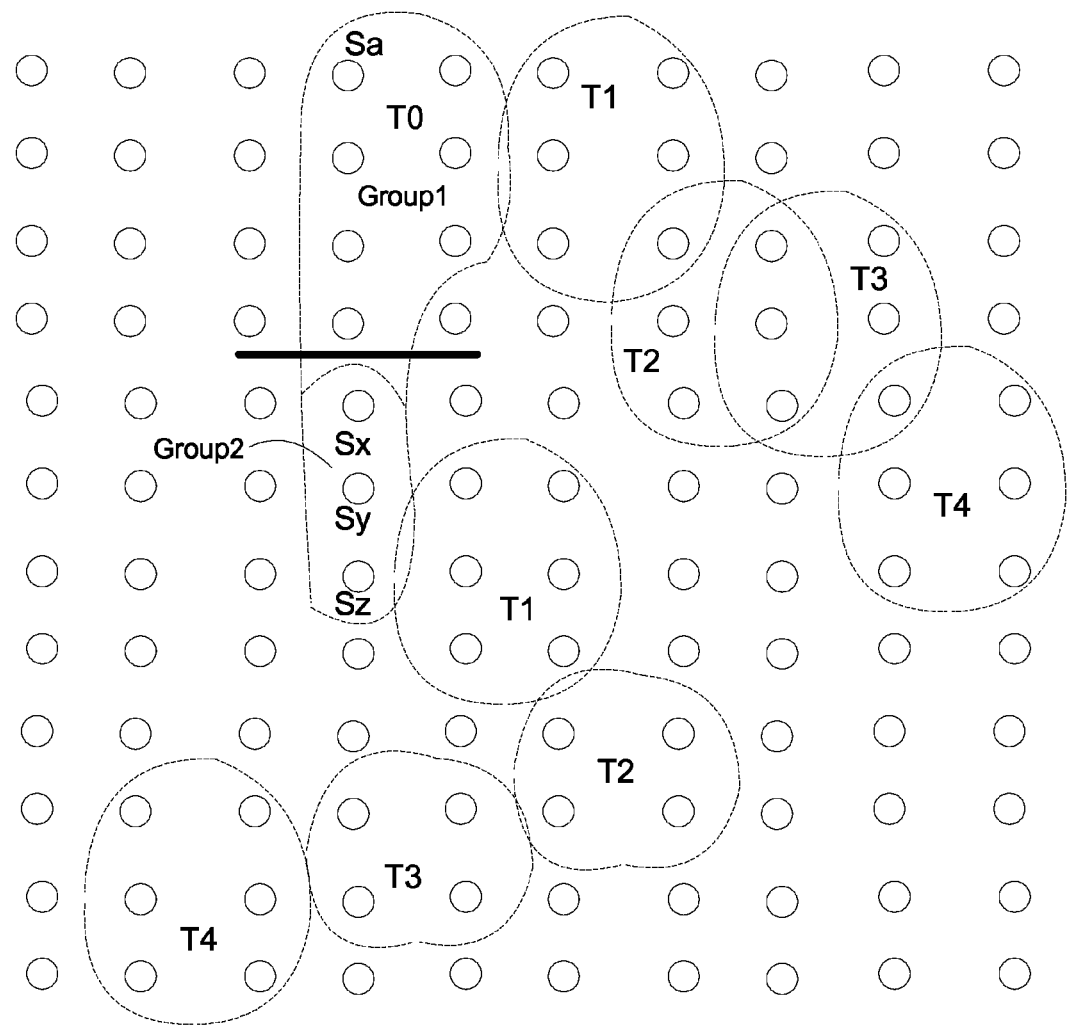
FIG. 6 shows an initially identified group of sensors being split, according to an embodiment.

FIG. 6 shows an initially identified group of sensors being split, according to an embodiment. As previously stated, the sensors Sx, Sy, Sz can be the basis for the formation of a new group, Group2. FIG. 6 shows subsequent groups of following time intervals T1, T2, T3, T4. As show, the group of the time interval T0 may provide the basis for more than one group. For an embodiment, the initial group is split, and separate groups are tracked over the subsequent time intervals.

Figure 7:
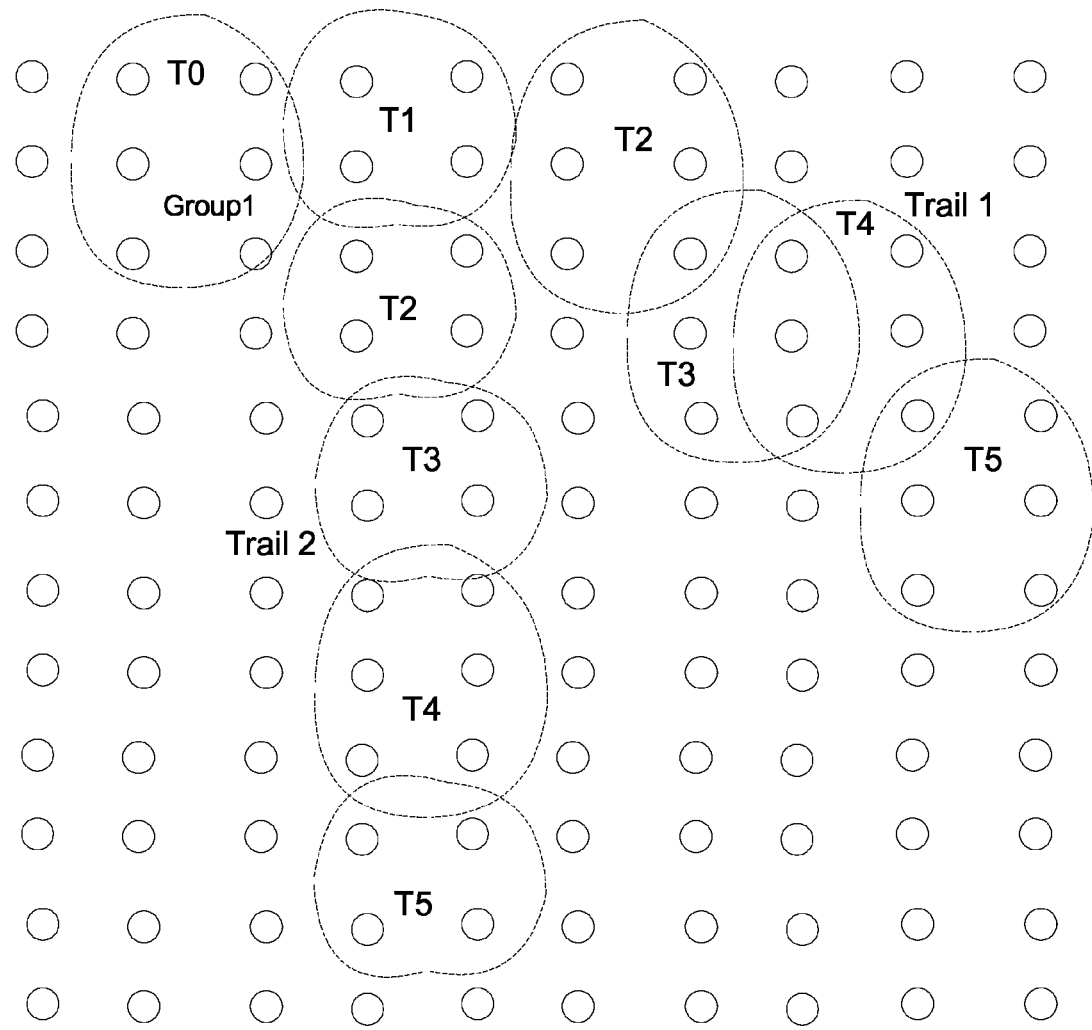
FIG. 7 shows an initially identified group of sensors being split, and two separate trails being formed, according to an embodiment.

FIG. 7 shows an initially identified group of sensors being split, and two separate trails being formed, according to an embodiment. As shown, a group is initially formed at time interval T0. Further, the group is tracked to time interval T1. However, at time interval T2, the group is split into two groups because retaining the active sensor as one group would be, for example, too large. At time intervals T3, T4, T5, the existing group and the newly formed group create two separate trails (trail 1, trail 2).

Figure 8:
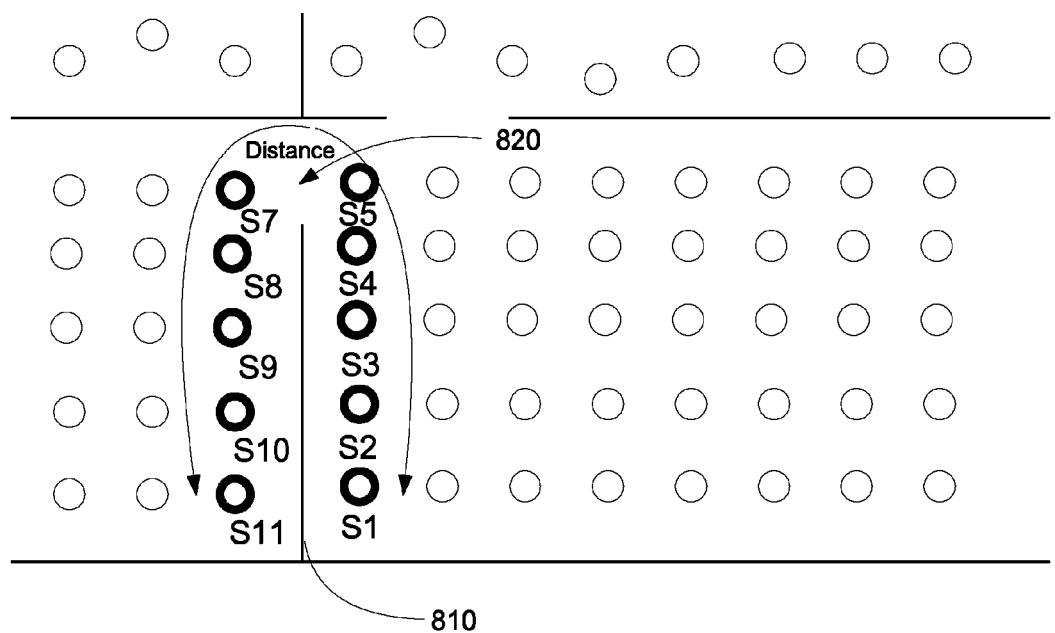
FIG. 8 shows an obstruction that includes a doorway, and formation of the group, according to an embodiment.

FIG. 8 shows an obstruction that includes a doorway, and formation of the group, according to an embodiment. This doorway and wall obstruction is similar to one depicted in FIG. 1. However, the potential group formed by the activated or triggered sensors S1-S11 that sense motion greater than the motion threshold, encompasses the wall 810, and passes through the doorway 820. However, as previously mentioned, at least some embodiment include a distance threshold in which activated sensors that are initially identified as member cannot be retained as members if the distance between them exceeds the distance threshold. In relation to the initially identified group of sensors S1-S11, and embodiment includes the distance between sensors being measured around and obstacles, such as the wall 810. Therefore, the distance is measured as depicted by the distance arrow. That is, the distance extends from S1 to S11 through the doorway 820. In order for the initially identified group to be retained, this distance must be less than the distance threshold.

FIG. 9 is a flow chart that includes steps of a method of tracking motion, according to another embodiment. A first step 910 includes identifying a group of sensors that includes a plurality of neighboring sensors sensing motion greater than a motion threshold during a time interval. A second step 920 includes tracking motion, comprising linking the group to at least one past group of at least one past time interval.

While the describe embodiments include tracking motion of identified groups across multiple time intervals, it is to be understood that for at least some embodiments a lack of motion is tracked. This is useful, for example, for tracking movement of an occupant who may have stopped moving.

For an embodiment, the tracked motion of the group includes at least one of the plurality of neighboring sensors within the group being different than a plurality of sensors of the at least one past group. That is, if for example, an occupant is moving within an area or a structure, the group of sensors that detect motion of the occupant changes from one time interval to a following time interval. At least some embodiments include confirming that the group changes are large enough to constitute motion of the group.

For at least some embodiments, the group of sensors is a subset of a larger set of sensors, and location data of each of the larger set of sensors is obtained, thereby allowing a determination of which of the larger set of sensors are neighboring sensors. That is, the group of sensors belongs or is within a larger set of sensors that are spaced about an area, room or structure. For at least some embodiments, the tracking of motion needs knowledge of what sensors are neighboring sensors. Information about the location of each of the sensors of the larger set of sensors allows a determination of which sensor are neighboring sensors. For example, the set of sensor closest to a sensor can be determined to be neighboring sensors. The set of sensors that are within a threshold of physical distance from a sensor can be determined to be neighboring sensors.

At least some embodiments include obtaining location data of obstructions located within the larger set of sensors. This information can be useful for group determination. For example, sensors may be identified as neighboring sensors based on their location. However, if the sensor are on opposite sides of an obstruction (such as, a wall) then it can be determined that the neighboring sensors cannot be included within a common group. Further, if a large group of sensors is formed that includes sensors in a doorway and sensors on both sides of walls, sensors far away from the doorway should not be included within the grouping. Further, if tracked motion appears to travel straight through an obstruction, a path of the tracked motion can be altered to pass around the obstruction.

For at least some embodiments, identifying the group of sensors that are included within the plurality of neighboring sensors sensing motion greater than the threshold during a time interval includes identifying a sensor that senses motion greater than the threshold, and then searching identified neighboring sensors of the sensor to find sensors that also sense motion greater than the motion threshold during the time interval. For at least some other embodiments, identifying the group of sensors that are included within the plurality of neighboring sensors sensing motion greater than the threshold during a time interval includes identifying a sensor that senses motion greater than the threshold, and then searching identified neighboring sensors of the sensor that also sense motion greater than a second motion threshold during the time interval. For an embodiment, the second motion threshold is less than the first motion threshold.

At least some embodiments further include refining the group of sensors, including checking locations of each of the plurality of sensors of the group and comparing the locations within locations of known obstructions, and eliminating sensor of the group that cannot be included within the group due to the location of the obstruction. That is, once a group of sensor is identified, the group is further analyzed to make sure it makes physical sense. That is, the group does not include sensors which clearly cannot be in a common group because an obstruction is located between sensors of the group.

At least some embodiments further include refining the group of sensors by determining whether the group is too large. That is, an initially determined group may be too large to actually make such a grouping possible. A threshold number of sensors can be selected in which a grouping is limited to be less than. For an embodiment, the refining of the group includes eliminating the existence of sensors of a group that are located a physical distance of greater than a threshold. That is, a physical distance can be selected or identified, wherein two sensors cannot be within a common group if the physical distance between them exceeds the selected or identified distance threshold.

For at least some embodiments, if the group is determined to be too large, then the group is split into multiple groups or one or more sensors are eliminated from the group. For an embodiment, if the group is split, then a determination is made of how many groups the sensors are split into (that is, 0, 1, 2, . . . ) where the groups formed (taking into account recent movement of groups), and which groups certain sensor are to belong.

At least some embodiments further include determining whether the group has a proper shape, comprising analyzing the plurality of sensors of the group to determine that locations of each of the sensors of the plurality of sensors indicates maintaining the sensor within the group. For an embodiment, determining whether the group has a proper shape includes identifying whether the group includes inactive interior sensors.

For at least some embodiment, tracking motion of the group includes matching the group of a current time interval with groups of prior time intervals to determine whether a trail of motion of the group is formed over a plurality of the time intervals.

At least some embodiments include confirming that the group originated from the at least one past group of at least one past time interval, including confirming that the group is location within a common area as the at least one past group, confirming that the group includes at least one neighboring sensors of the at least one past group. At least some embodiments include confirming that the group originated from the at least one past group of at least one past time interval, comprising confirming that the group is location within a common area as the at least one past group, confirming that the group includes at least one neighboring sensors that is a neighboring sensor of at least one sensor of the at least one past group.

At least some embodiments include designating the group as a child of the at least one prior group upon confirmation of origination. At least some embodiments include evaluating all child groups of a prior group to determine which of the child groups provides a most likely trail of the prior group. At least some embodiments include ranking each of the child groups based on at least one of a number of shared sensors, a quantity of sensors within the child group, a direction of travel between the prior group and the child group, and selecting the child group with the highest rank as the most likely trail of the prior group. Further, groups that include back and forth motion (jitter) may not be tracked.

Although specific embodiments have been described and illustrated, the described embodiments are not to be limited to the specific forms or arrangements of parts so described and illustrated. The embodiments are limited only by the appended claims.

What is claimed:

1. A method of tracking motion, comprising:
   sensing, by a plurality of sensors of a plurality of fixtures, motion;
   identifying, by a controller that receives sense information from the plurality of sensors, a group of sensors that includes a plurality of neighboring sensors sensing motion greater than a motion threshold during a time interval;
   tracking motion, by the controller, comprising:
      linking the group to at least one past group of at least one past time interval, wherein the at least one past group includes a group of sensors that sensed motion during the at least one past time interval; and
      confirming, by the controller, that the group originated from the at least one past group of the at least one past time interval, comprising confirming that the group is located within a common area as the at least one past group, and confirming that the group includes at least one neighboring sensors of the at least one past group; and
   controlling an environmental parameter of at least the common area based on the tracked motion.

2. The method of claim 1, wherein tracked motion of the group includes at least one of the plurality of neighboring sensors within the group being different than a plurality of sensors of the at least one past group.

3. The method of claim 1, wherein the group of sensors is a subset of a larger set of sensors, and further comprising obtaining location data of each of the larger set of sensors, thereby allowing a determination of which of the larger set of sensors are neighboring sensors.

4. The method of claim 1, further comprising obtaining location data of obstructions located within the larger set of sensors.

5. The method of claim 4, further comprising determining whether the group has a proper shape, comprising analyzing the plurality of sensors of the group to determine that locations of each of the sensors of the plurality of sensors indicates maintaining the sensor within the group.

6. The method of claim 5, determining whether the group has a proper shape includes identifying whether the group includes inactive interior sensors.

7. The method of claim 1, wherein identifying the group of sensors that includes the plurality of neighboring sensors sensing motion greater than the threshold during a time interval comprises identifying a sensor that senses motion greater than the threshold, and then searching identified neighboring sensors of the sensor that also sense motion greater than the motion threshold during the time interval.

8. The method of claim 7, further comprising refining the group of sensors, comprising checking locations of each of the plurality of sensors of the group and comparing the locations within locations of known obstructions, and eliminating sensor of the group that cannot be included within the group due to the location of the obstruction.

9. The method of claim 7, further refining the group of sensors, comprising determining whether the group is too large.

10. The method of claim 9, wherein if the group is determined to be too large, then splitting the group into multiple groups or eliminating one or more sensors from the group.

11. The method of claim 9, wherein if the group is split, determining whether one of more of multiple split groups should be combined with another group.

12. The method of claim 1, wherein tracking motion of the group comprises matching the group of a current time interval with groups of prior time intervals to determine whether a trail of motion of the group is formed over a plurality of the time intervals.

13. The method of claim 1, further comprising confirming that changes of the group are large enough to constitute motion of the group.

14. A method of tracking motion, comprising:
   sensing, by a plurality of sensors, motion;
   identifying, by a controller that receives sense information from the plurality of sensors, a group of sensors that includes a plurality of neighboring sensors sensing motion greater than a motion threshold during a time interval;
   tracking motion, by the controller, comprising:
      linking the group to at least one past group of at least one past time interval, wherein the at least one past group includes a group of sensors that sensed motion during the at least one past time interval;
      confirming, by the controller, that the group originated from the at least one past group of at least one past time interval, comprising confirming that the group is located within a common area as the at least one past group, confirming that the group includes at least one neighboring sensors that is a neighboring sensor of at least one sensor of the at least one past group; and
   controlling an environmental parameter of at least the common area based on the tracked motion.

15. The method of claim 14, further comprising designating the group as a child of the at least one prior group upon confirmation of origination.

16. The method of claim 15, further comprising evaluating all child groups of a prior group to determine which of the child groups provides a most likely trail of the prior group.

17. The method of claim 15, further comprising ranking each of the child groups based on at least one of a number of shared sensors, a quantity of sensors within the child group, a direction of travel between the prior group and the child group, and selecting the child group with the highest rank as the most likely trail of the prior group.

18. A system for tracking motion, comprising:
   a plurality of sensors;
   a controller that receives sense information from the plurality of sensors, wherein the controller is operative to:
   identify a group of sensors that includes a plurality of neighboring sensors sensing motion greater than a threshold during a time interval;
   track motion of the group, comprising:
      linking the group to at least one past group of at least one past time interval;
      confirming that the group originated from the at least one past group of the at least one past time interval, comprising confirming that the group is located within a common area as the at least one past group, confirming that the group includes at least one neighboring sensors of the at least one past group; and
control an environmental parameter of at least the common area based on the tracked motion.

19. The system of claim 18, wherein tracked motion of the group includes at least one of the plurality of neighboring sensors within the group being different than a plurality of sensors of the at least one past group.

* * * * *